April 22, 1941.　　W. H. OSBORN ET AL　　2,239,370
SEPARATION OF METALS BY DISTILLATION
Filed July 15, 1939　　6 Sheets-Sheet 3

INVENTORS
WILLIAM H. OSBORN
SYDNEY B. TUWINER
BY
Paul R. Ames
ATTORNEY

INVENTORS
WILLIAM H. OSBORN
SIDNEY B. TUWINER
BY Paul R. Ames
ATTORNEY

Patented Apr. 22, 1941

2,239,370

UNITED STATES PATENT OFFICE 2,239,370

SEPARATION OF METALS BY DISTILLATION

William H. Osborn, New York, and Sidney B. Tuwiner, Kew Gardens, N. Y., assignors to Phelps Dodge Corporation, New York, N. Y., a corporation of New York Application July 15, 1939, Serial No. 284,677

36 Claims. (Cl. 75—63)

This invention relates to a method and apparatus for the separation of metals by distillation and condensation. It is particularly useful in the separation by vaporization and condensation, under controlled conditions of temperature and pressure, of lead, arsenic, antimony, bismuth and other metals from tin or from each other, but it may also be used in the separation of other metals and also of other substances requiring high temperatures for distillation.

In the separation by distillation of metals and other substances requiring very high temperatures to vaporize them, a considerable problem is presented because of the difficulty in finding suitable structural materials to withstand the high temperatures. The permeability at high temperatures of the materials commercially available for such purposes makes the application of high vacuums difficult or impossible with equipment previously available. Also, the fusibility and reactivity of the molten metals or metal vapors with materials with which they contact, present difficult problems in the separation of metals by distillation.

It is an object of this invention to provide an improved method and apparatus for making such separations. It is also an object to provide an improved distillation apparatus for high temperature vacuum distillation. A further object is to provide a method and apparatus in which fractionation of metals by distillation and condensation under vacuum may be carried out continuously. Another object is to provide such a method and apparatus in which the heat necessary to achieve the distillation may be applied to the interior wall of an annular vacuum chamber. An object also is to provide means for accommodating the differences in expansion and contraction of the materials of the apparatus that are subjected to temperature differences of great magnitude. It is also an object to provide means for continuously withdrawing material from the vacuum chamber. Other objects will become apparent.

In utilizing the invention, mixtures of two or more metals in the molten state may be introduced into a chamber maintained under vacuum and flowed over a heated surface of the chamber to vaporize one or more of the metals. A condensing surface also may be provided within the chamber and the condensate and unvaporized residue may be separately collected in the chamber or continuously withdrawn therefrom. The condensing surface is preferably located near the heating surface and uniformly spaced therefrom.

In this manner, various metals may be separated continuously from other metals by distillation at relatively low temperatures and without substantial oxidation.

The apparatus should be one that provides a path for the molten metal, etc. of refractory material that will not be adversely affected by or affect the metals, etc. of the molten mixture, within an enclosure of sufficient structural strength and impermeability to withstand the temperatures and high vacuums applied to it during the distillation.

In describing the method and apparatus, reference will be made to the drawings in which several modifications are illustrated, but it is not intended to thereby limit the invention to the particular embodiments shown and described.

The apparatus as illustrated consists essentially of two cylinders having their major axes in a vertical plane and so arranged as to leave an annular space between them within which a vacuum may be maintained. This annular space may be formed by using cylinders of equal length and closing the annular space between them at both ends or the inner cylinder may be made shorter than the outer and the lower end of each cylinder may be closed separately.

The molten mixture of metals to be subjected to the distillation is caused to pass along the heated surface of one of these cylinders and the products of distillation are caused to condense along the cooled surface of the other cylinder, which latter surface is maintained at a temperature sufficiently low to insure the desired condensation. The metal to be distilled is passed into the apparatus in a molten condition through a regulator valve or other suitable feed means. The condensate and the residue from distillation may be withdrawn from the apparatus by means of barometric tubes which discharge into cups, or wells, of molten metal, or by other suitable means, such as pumps.

Referring to the drawings, Figure 1 is a diagrammatic view of a general assembly embodying the invention.

Figure 5 is a vertical cross sectional view, similar to Figure 2, of a modified form of the apparatus.

Figure 1:
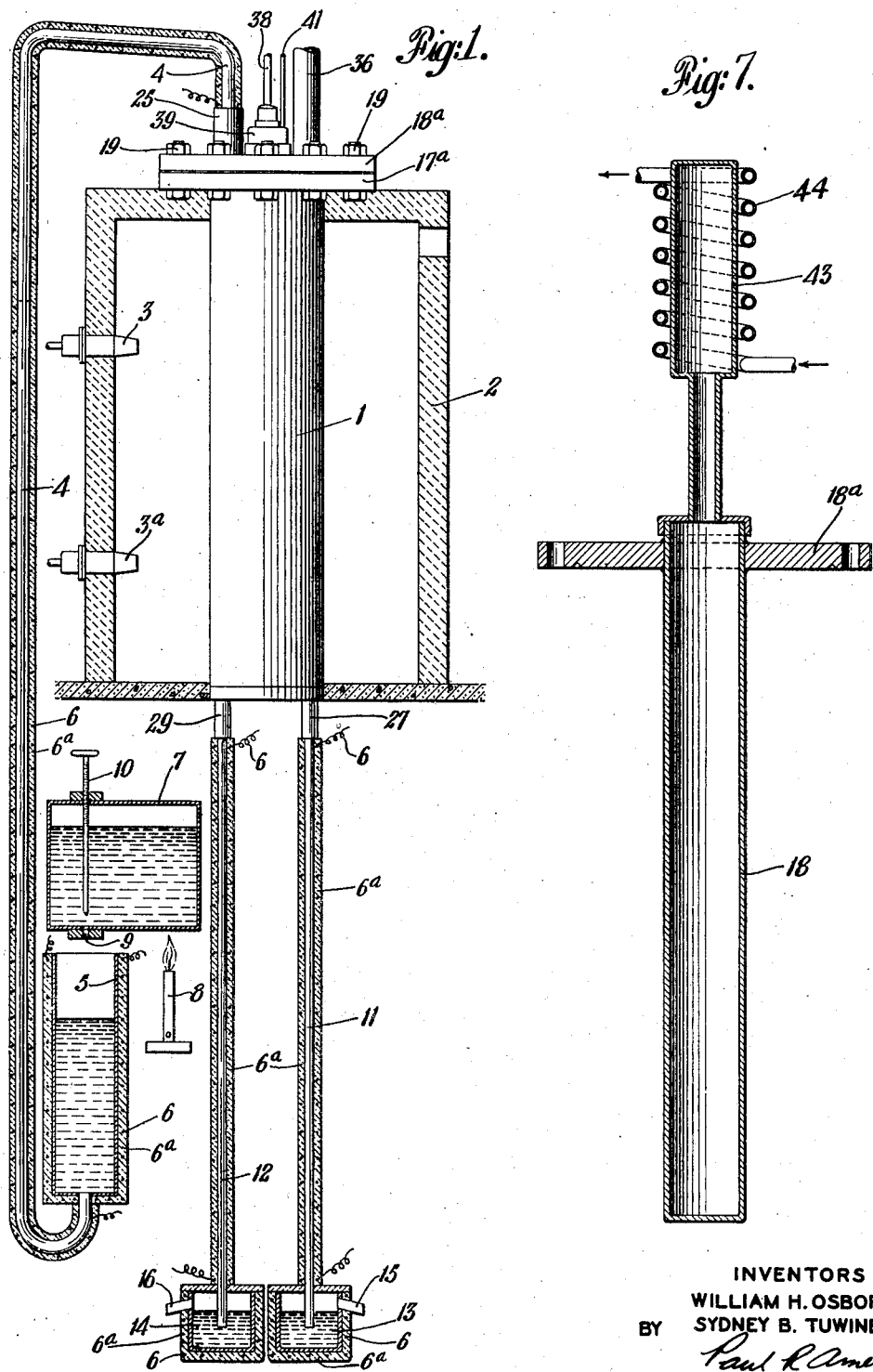

The distilling apparatus illustrated includes the still 1, which may be located within a furnace 2 heated by any suitable means, such as the two burners 3 and 3a or by electrical resistance wires, etc.

The materials to be separated may be fed to the apparatus through a barometric tube 4, which is connected in a U-bend to an open ended enlarged tube 5. This barometric tube and the tube 5 may be surrounded by a heating medium, such as the electric heating element 6 in an insulating material 6a, or by other suitable means, to maintain the material being fed in a molten condition. The tube 4 should be long enough to form a barometric column of feed material when the vacuum is applied and the tube 5 should be large enough to hold the contents of the tube 4 when the vacuum is released. The material to be fed may be held in a cast iron pot 7 heated by suitable means, such as the burner 8, and discharged through an orifice 9 into the tube 5. The flow of material through the orifice may be controlled by the needle valve 10 of suitable shape to give the desired control of rate of flow.

The condensate and residue may be withdrawn from the lower end of the apparatus by any suitable means, for example, the lower end of the distilling apparatus may communicate with two barometric tubes 11 and 12, which may be heated by any suitable means, such as electric heating elements 6, 6 in the insulation 6a, to maintain the metals molten within the tubes. The lower ends of the tubes 11 and 12 enter the receivers 13 and 14, respectively, having outlets 15 and 16 and surrounded by heating and insulating means 6, 6a or other suitable means for maintaining the metal within the receivers molten.

Figure 2:
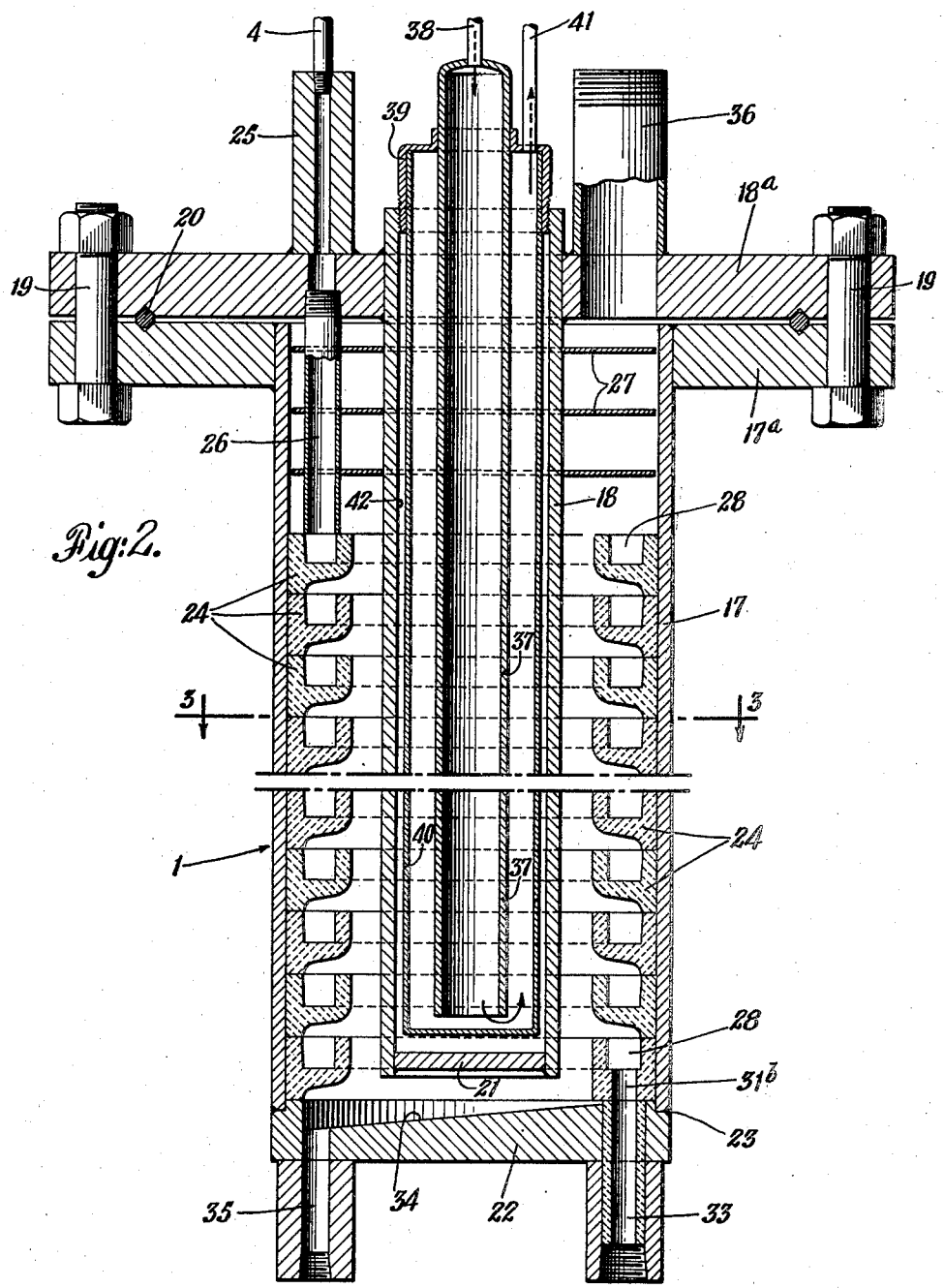
Figure 2 is a vertical cross section along a diameter of an apparatus embodying the invention, the drawing being broken away to indicate greater length.
Figure 3:
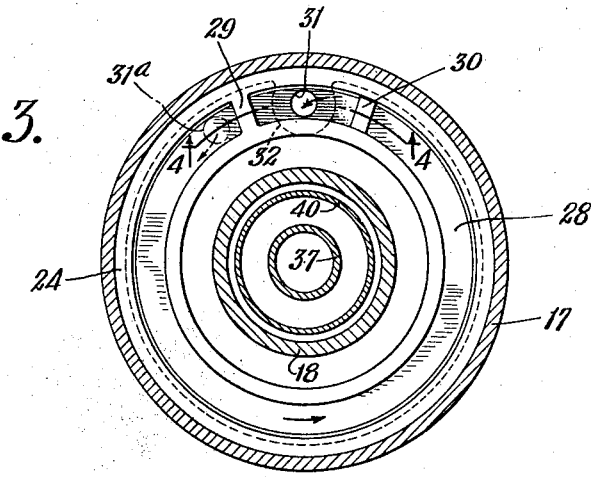
Figure 3 is a sectional view of the apparatus, taken on the line 3—3 of Figure 2.

As illustrated in Figures 2 and 3, the still 1 is made up of an outer heating cylinder 17 and an inner condensing cylinder 18, each of which cylinders is provided with a flange, 17a and 18a, respectively, which flanges are held together by means of bolts 19. The space between the flanges 17a and 18a is sealed by means of an annular gasket 20 of copper or other suitable material. The bottom portion of the inner cylinder 18 is closed by a plate 21. The bottom portion of the outer cylinder 17 is closed by a closure 22, the connection being sealed at 23.

Within the annular space between the cylinders 17 and 18, there is positioned a series of rings 24, which may be made of graphite or other material suitable to hold the molten metal. The bottom one of these rings rests upon and is supported by the closure 22, and the others rest upon each other in such a manner that they may be readily replaceable when repair or dismantling of the apparatus is necessary. The inlet pipe 25 communicates with the tube 4 and with a tube 26 extending downwardly from the flange 18a and terminating at the upper surface of the upper ring 24. Annular heat reflecting vanes or baffles 27 are positioned in the portion of the annular space above the rings 24 to prevent excessive loss of heat by radiation to the flanges 17a and 18a. A cover may be provided over the upper ring to prevent splashing, if, on heating to the distilling temperature, the end of the tube 26 is separated from the surface of the top ring 24.

Figure 4:
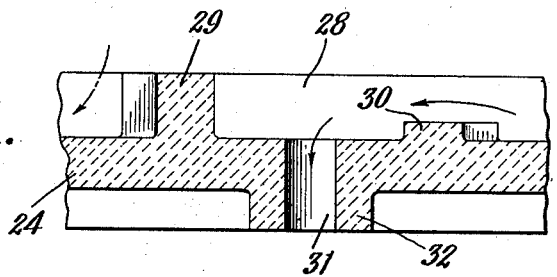
Figure 4 is an enlarged fractional, cross sectional view of one of the rings, taken approximately on the line 4—4 of Figure 3.

Each of the evaporator rings 24 is provided with an annular groove 28, in which, as illustrated in Figures 3 and 4, there is positioned a baffle 29 extending the full height of the groove 28 and a baffle 30 of lesser height. Between the two baffles 29 and 30 there is a hole 31 through which the molten metal discharges to the next ring. A cylindrical boss 32 surrounds the lower portion of the hole 31. The rings are so rotated relative to each other that the liquid discharged from each upper ring falls within the groove 28 just to the left of the baffle 29 of the ring below it, as illustrated in Figure 3, where the dotted circle 31a indicates the position of the discharge from the ring above. Thus the liquid traversing each ring must pass around the annular groove and over the baffle 30 before it is discharged through the hole 31 to the next ring. With this arrangement the molten metal is caused to follow an extended path around each ring and a liquid level of molten metal is maintained. If desired, the holes and baffles may be so arranged as to change the direction of flow of the liquid in any or all of the rings.

The lower ring 24 has a discharge opening 31b over the graphite outlet tube 33 in the closure 22. The closure 22 is provided with a slanting bottom, as illustrated at 34, and an outlet tube 35 communicates with the lower portion of this slanting bottom. The outlet tubes 33 and 35 communicate with the barometric tubes 11 and 12, respectively. The slant of the bottom 34 is of importance in helping to prevent splashing of the condensed metal into the lower ring in which the undistilled metal flows.

The upper end of the annular space between the cylinders 17 and 18 is provided with a connection 36 leading to means for maintaining a vacuum, such, for example, as a vacuum pump (not shown).

Figure 7:
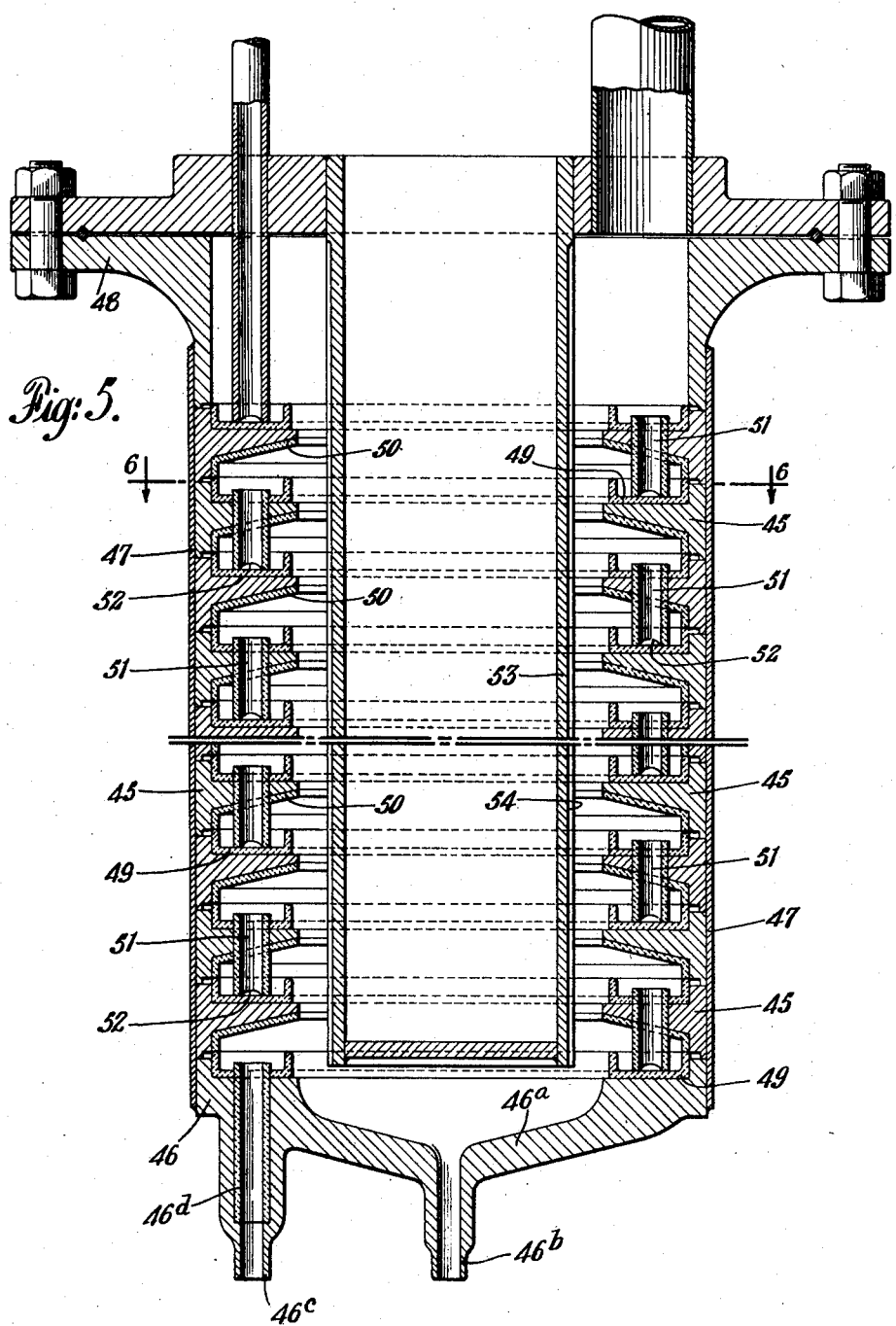
Figure 7 is a vertical sectional view on a diameter of a modified form of condenser unit.

The inner surface of the cylinder 18 may be cooled by any suitable means. For example, a brass pipe 37, open at its lower end, may extend into the space within the cylinder 18 and cooling water may be supplied to it through the inlet 38. The pipe 37 may be supported in the cylinder 18 by the screw threaded collar 39. This collar 39 also carries a brass pipe 40 which is closed at its lower end. The water used for cooling may be withdrawn through the outlet pipe 41. With this arrangement a closed air space 42 is provided between the cylinder 18 and the pipe 40 across which the heat is transferred by radiation. Other means may, of course, be provided for cooling the inner surface of the cylinder 18. For example, as illustrated in Figure 7, the cylinder 18 may be connected with a condenser 43 cooled by the cooling coil 44, and the space within the cylinder 18 may be filled with a constant boiling liquid, boiling at the desired temperature, e. g., for the separation of lead from tin, at about 700° F. The heat transmitted through the wall of the cylinder 18 will cause the liquid within that cylinder to boil and the resulting vapors will be condensed in the condenser 43, thus providing for a uniform and controlled withdrawal of heat from the cylinder 18.

In a particular apparatus of the construction illustrated in Figure 2 that operated satisfactorily, the outer cylinder 17 was a chrome-nickel steel pipe 6 inches in diameter and the inner cylinder 18 was a chrome-nickel steel pipe 2½ inches in diameter. The grooves 28 in the graphite rings were 5⅝ inches outside diameter by 4⅝ inches inside diameter by ½ inch deep. Eighteen rings were used, and the height of the portion of the tube 17 containing the rings was 24 inches. In this apparatus the distance between the inner edge of the groove 28 and the condensing surface 18 was 1⅜ of an inch and the space between the pipe 40 and the cylinder 18 was 1/16 of an inch.

In using the apparatus described, the cylinder 17 is heated to the desired distillation temperature and a molten mixture of the metals to be separated is run into the tube 5 and each of the receivers 13 and 14 is filled with the molten metal, such as is to be collected in it. The desired vacuum is then applied at 36, additional molten metal being added to the receivers 13 and 14 to compensate for that drawn up into the pipes 11 and 12 by the vacuum maintained within the annular space between the cylinders 17 and 18. The pipes 4, 11 and 12 are of such length that the weights of the columns of metal in them are equal to the difference between the atmospheric pressure and the absolute pressure within the apparatus. With this arrangement the molten material to be separated will flow into the grooves 28 at the rate it is introduced into the tube 5 and the condensate and distillate will flow out of the receivers 13 and 14 at the rates at which they are produced.

For the separation of lead from a mixture of lead and tin, for example, the receiver 13 may be filled with molten tin and the receiver 14 with molten lead. The apparatus may be exhausted to an absolute pressure of approximately 0.05 millimeter of mercury and the molten mixture may be fed into the tube 5. The tube 17 may be externally heated to a temperature of about 1800° F. and the tube 18 may be cooled by running water through the brass pipes 37 and 40 so as to maintain the tube 18 at approximately 1200° F.

In the separation under these conditions of tin and lead present in solder metal containing roughly 50% tin and 50% lead, the molten solder metal may be introduced through the inlet pipe 4 at a rate of approximately 12 pounds per hour by means of a suitable control, such as the valve 10. The molten metals will flow down through the pipe 26 into the groove 28 in the upper ring 24 and will then flow around this ring, over the baffle 30 and out through the opening 31 and into the groove 28 of the next ring at the point just beyond the baffle 29 of that ring. Thus the molten metal will traverse each of the grooves in the rings 24 until it reaches the outlet 31b through which the undistilled tin will be discharged into the barometric tube 11 and will flow out of the overflow pipe 15 of the receiver 13.

Lead will be vaporized from the mixture passing through the still and will be condensed upon the inner walls of the tube 18 and flow down that tube and onto the slanting surface 34, out through the outlet 35 and pipe 12, and will overflow from the lip 16 of the receiver 14. By following this procedure a substantially pure lead may be obtained from the overflow of the receiver 14 and a tin enriched bullion containing better than 90% tin may be withdrawn from the overflow pipe of the receiver 13.

Figure 6:
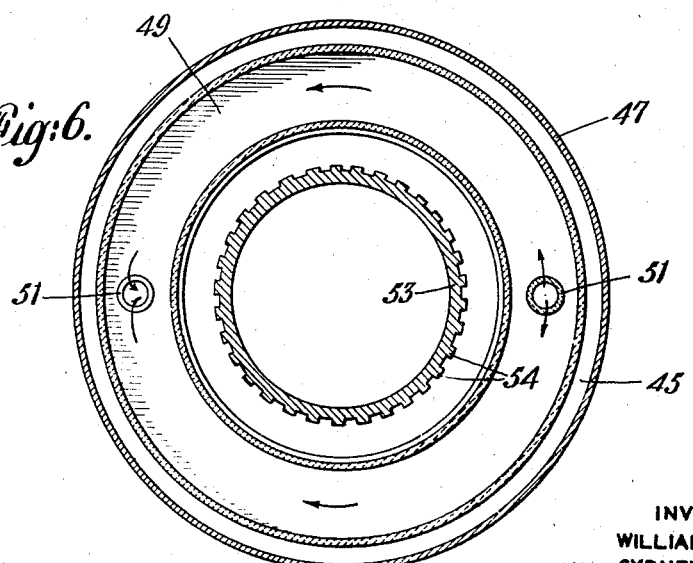
Figure 6 is a sectional view, taken on the line 6—6 of Figure 5.
Figure 9:
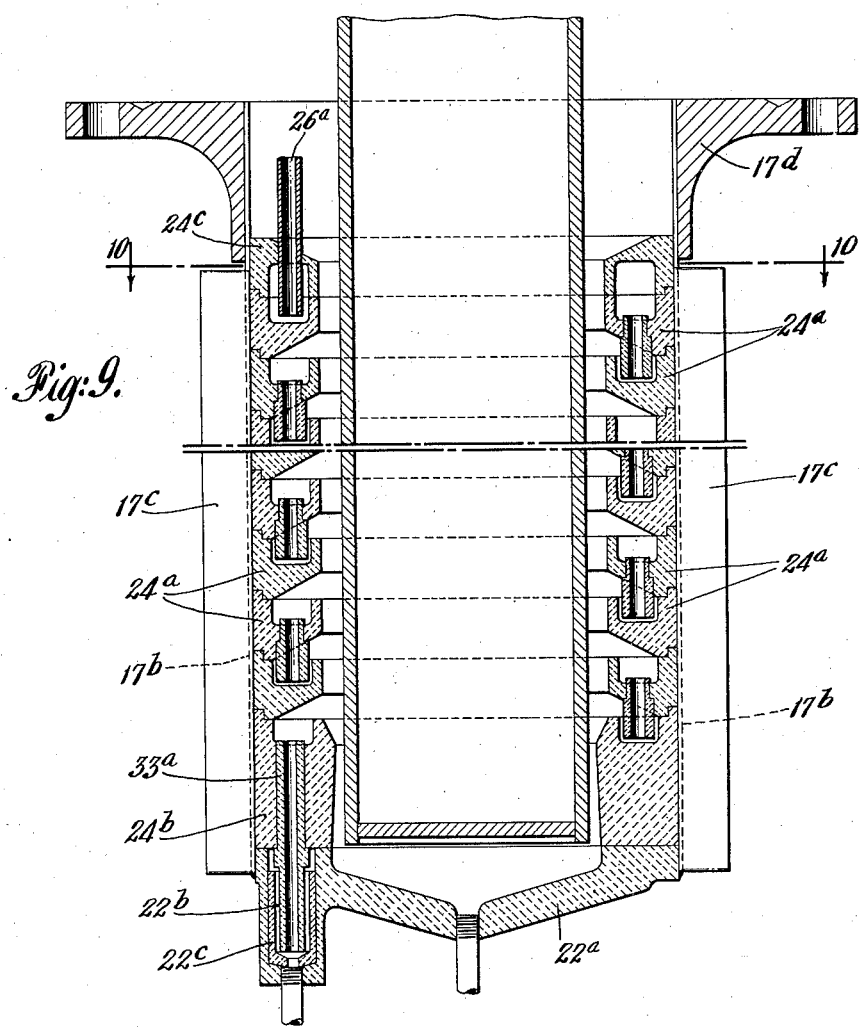
Figure 9 is a view similar to Figure 2 of another form of the invention.
Figure 10:
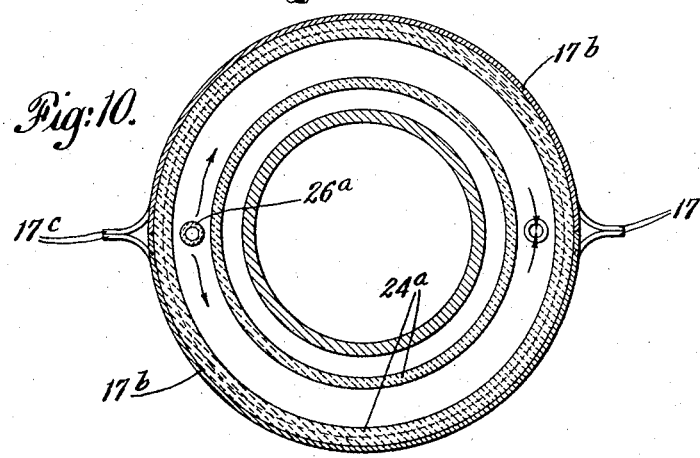
Figure 10 is a section on line 10—10 of Figure 9.

Figures 5 and 6 show an arrangement similar to that illustrated in Figures 2, 3 and 4. In this embodiment the rings 45, supported upon the bottom closure plate 46, are enclosed within the outer shell 47 welded to the flange plate 48 and to the closure plate 46. This shell may be provided with one or more expansion joints, as illustrated in Figures 9 and 10. The rings 45 in this apparatus are of heavier and stronger construction than in that shown in Figure 2, so as to withstand a greater portion of the differential pressure between the inside and the outside of the annular space. These rings may be of cast chrome-nickel steel or other suitable material. The shell 47, which serves as an enclosing and sealing means, may be of lighter construction and of a material able to withstand the high temperatures of the heating means. For example, a non-corrosive chromium-nickel steel containing 20 to 24% chromium and 10 to 15% nickel may be used for this purpose. This shell is preferably rolled, forged, or otherwise prepared to give a thin, flexible shell that will collapse against the rings when the vacuum is applied and give a good seal between, and thermal contact with, the rings. Such material may be relatively impermeable to gases of the atmosphere. If desired, a more permeable material may be used and an impermeable plating, such as a chrome plating, may be applied to the inner and/or outer surfaces. Each of the rings 45 is cut out to receive a graphite insert ring 49, and a graphite cover ring 50 is positioned beneath each ring 45, resting upon the inset ring 49 beneath it. The rings 49 may be provided with baffles and outlets arranged as described in connection with Figures 3 and 4. If desired, however, the baffles may be omitted and the outlet hole for each ring may be positioned on the opposite side from the outlet hole of the ring above it, as illustrated in Figure 6. With this arrangement, and when the rings are properly levelled, the liquid flowing onto each ring will divide and flow equally around each side of the annular groove and out through the outlet tube 51 into the next ring, where it will flow in the opposite direction. The outlet tubes 51, which may also be made of graphite, are of such a length as to project, at their upper ends, above the bottom of the rings 49 to assure a liquid level in each of the rings 49. These tubes may extend to the bottom of the inset ring beneath it and may be cut away at their bottom ends, as shown at 52, so that the molten metal will be discharged onto the ring beneath. If desired, a cover may be applied over the top ring 49 to prevent splashing of the material as it is introduced.

The inner tube 53 may have a smooth, outer wall, as illustrated in Figure 2, or it may be milled, as illustrated in Figures 5 and 6, to provide grooves 54 extending vertically. The bottom plate 46 is provided with a curved or slanting bottom 46a, shaped to minimize splashing of the condensed metal and to direct it to the outlet 46b for the distilled and condensed metal. This plate 46 is also provided with an outlet 46c with a graphite lining tube 46d for the undistilled residue.

Heat baffles, such as the baffles 27, may be provided in the annular space above the rings.

The cooling of the inner tube 53 may be by means of water circulation, as illustrated in Figure 2, or by a constant boiling liquid, as illustrated in Figure 7, or by other suitable means.

The outer surface of the shell 47 may be heated by any suitable means, such as the furnace 2.

An apparatus as illustrated in Figures 5 and 6 and having the following dimensions may be used. A shell 47, 1/16 inch thick and having an inside diameter of 13⅞ inches; an inside cylinder 53 having an outside diameter of 6⅝ inches; rings 49 having an inside diameter of 8½ inches and being 2 5/16 inches wide and 1/16 inch thick. The distance between the inside edge of the groove in the ring 49 and the condensing surface in this apparatus may be 1 1/16 inches. The outer shell 47 may be 60 inches long and 24 rings may be provided.

With the construction shown in Figures 5 and 6, the weight and resistance to collapsing may be borne principally by the cast rings 45, while the outer shell 47 provides a skin that is more impermeable to gases of the atmosphere at the high temperatures to which it is subjected. Thus this apparatus provides a metal shell on metal supporting rings and will withstand high temperatures, will give at these temperatures the requisite structural strength to the apparatus, will conduct sufficient heat to the apparatus carrying the molten metal, and will be sufficiently impermeable to gases from the atmosphere at those temperatures to permit the attainment of a relatively high vacuum. It also provides a path of refractory materials in contact with the molten metal which will not combine with or absorb or be injured by the molten metal.

In view of the great differences in the temperatures of the apparatus when cold and when heated, it is desirable to provide means for accommodating the differences in expansibility of the materials used. Figures 9 and 10 illustrate an apparatus especially suited to meet such requirements. In this apparatus the graphite rings 24a are somewhat heavier than those in Figure 2. The outer shell 17b is of ⅛ inch nichrome sheet (80% nickel, 20% chromium) and is provided with two expansion joints 17c, 17c, extending up to just below the flange 17d. These expansion joints are formed by curving the metal outwardly, as illustrated in Figure 10, and welding the outwardly curved portions together along their outer edges. The upper and lower ends of the expansion joints may be sealed by a filler or plate welded into or across the curved triangle or by pinching the metal together and welding it or by other suitable means. The rings may communicate with each other through openings or graphite pipes arranged in respect to baffles as illustrated in Figures 3 and 4, or through openings or graphite pipes arranged as illustrated in Figures 5 and 6. The bottom ring 24b is thicker than the other rings and is provided with a graphite outlet tube liner 33a extending into a well 22b in the bottom closure plate 22a. This well 22b is also provided with a graphite liner 22c. The inner surface of the bottom ring 24b is of smaller diameter at its top than at its bottom to assist in preventing metal from splashing from the bottom plate 22a into the groove in the bottom ring. In this arrangement the upper graphite ring is provided with a graphite cover ring 24c and the feed pipe 26a extends through this cover ring and to a point near the bottom of the groove in the upper ring. The upper portion of the shell 17b may be welded or otherwise fastened within the flange 17d, so that the graphite rings may be removed without taking the shell apart.

The apparatus illustrated in Figures 9 and 10 may be about the size of that described in reference to Figure 5. It may be provided with a condensing surface and cooling and heating means and other features as described in connection with the other modifications. Also, the various features described in connection with the apparatus of Figures 9 and 10 may be used with the apparatus illustrated in the other figures or substituted for the corresponding features thereof.

In using the apparatus illustrated in Figures 9 and 10, the apparatus is positioned in a suitable heating furnace, such as that shown in Figure 1, and is heated to the desired distilling temperature while the annular portion between the heating and condensing surfaces is filled with a non-oxidizing or inert gas, such as hydrogen, nitrogen, etc., at a pressure equal to or slightly greater than the external atmospheric pressure (e. g., about 15 pounds per square inch absolute pressure or about 0 pounds gauge pressure). (If hydrogen is used the apparatus is preferably evacuated before introducing the hydrogen to remove the oxygen present.) During this period of heating, the nichrome shell, having a greater coefficient of thermal expansion than the graphite rings, will expand horizontally (i. e., in planes perpendicular to its major axis) away from the graphite rings and leave a clear tolerance between itself and the rings. At the same time the shell will expand longitudinally (i. e., parallel to its major axis). The graphite rings resting on the bottom cast metal piece 22a will be free to settle relative to the elongation of the shell, and remain stacked one on top of the other. In this position the feed tube 26a will be carried up with the elongation of the shell and so will be at a greater distance from the bottom of the groove in the top ring 24a. The cover ring 24c will prevent splashing of the metal fed through this pipe.

When the operating temperature of the apparatus is reached, the vacuum pump is applied and the hydrogen, nitrogen or other inert gas thus pumped out. The thickness of the nichrome sheet is such that the atmospheric pressure on the outside of it will cause it to collapse or contract and fit closely against the graphite rings. In contracting, the radius of curvature of the expansion joints 17c will be reduced and the expansion joints will take up the excess material of the shell. The strength in compression of the compressed graphite rings should be sufficient to withstand the external atmospheric pressure transmitted to them by the collapse of the nichrome shell. If desired, lined metal rings as illustrated in Figure 5 may be used to supply additional compressive strength.

When the apparatus has to be cooled off, for example, prior to a shut down, the vacuum pump will be shut off and hydrogen, nitrogen or other gas again introduced into the chamber at a pressure of about 5 pounds per square inch gauge pressure. This pressure will tend to inflate or expand the shell causing the interior surface of the shell to separate from the outer surface of the graphite rings. When this has occurred, the temperature will be lowered and, upon cooling, the parts will contract without interfering and without such a differential shrinkage between the metal of the shell and the graphite of the rings as would cause an excessive squeezing action on the surface of the rings.

Instead of heating the outer surface and cooling the inner surface, it may be desirable in some instances to reverse the operation and provide heating means within the inner tube and cooling or condensing means outside of the outer tube. Such an arrangement may be advantageous where the inner cylinder is sufficiently large that the heat absorption capacity is enough to balance the radiating capacity. In such a device the rings carrying the metals to be separated should be in direct contact with the inner wall, rather than the outer wall as in the construction illustrated in the drawings previously discussed, in order that the conductivity of the metal may serve to transmit heat units from the heated surface to the distilling rings. Or the inner cylinder may be of suitable metal or other material, machined to provide circular ribs, means being provided for permitting the metal to flow from one rib to the next lower one. The heat may be supplied by an alundum tube wrapped with a nichrome wire and positioned within the cylinder or by a radiant carborundum tube in which a flame is burned or by other suitable means.

Figure 8:
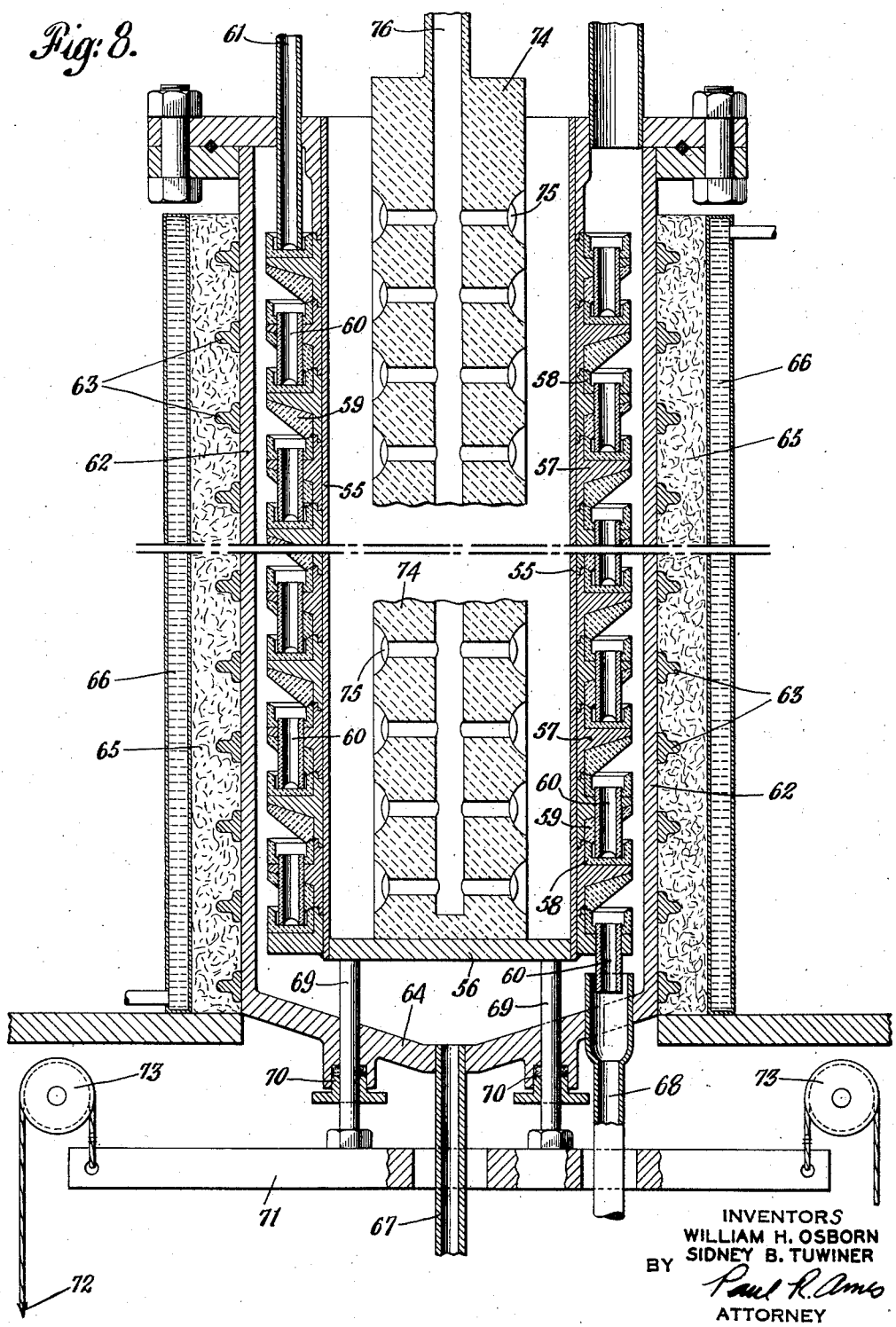
Figure 8 is a vertical cross sectional view similar to Figure 2 of another form of the apparatus.

Figure 8 illustrates apparatus with such inside heating and outside cooling. In this apparatus 55 is a chrome-nickel steel shell made of butt-welded sheet and welded to the top flange. This shell is closed at its lower end by the plate 56. The support rings 57, of chrome-nickel steel, are slipped over the shell 55 and the bottom one is welded to the ring to support the rings on top of it. Graphite rings 58, covers 59 and connecting pipes 60, similar to those illustrated in Figure 5, provide an evaporating surface for the metal mixture fed through the feed pipe 61. A condensing cylinder 62, preferably made of heat resistant steel and strengthened by the external ribs 63, is bolted by a suitable flange to the flange of the shell 55 and is closed at its bottom by a suitable dish-shaped bottom piece 64, which forms an integral part of the condensing cylinder. The condensing temperature may be regulated by any suitable means, such as a layer of insulation 65 backed up by a water jacket 66 by which the amount of heat withdrawn may be regulated. The condensed distillate runs down the inner surface of the condensing cylinder and out through the pipe 67, which forms a barometric seal as in the other apparatus described. The undistilled residue reaches the lowest ring and passes out through the pipe 68, forming a barometric seal.

In the apparatus illustrated, the bottom graphite connecting pipe 60 enters the enlarged portion of the pipe 68 without a tight joint to allow for differential expansion between the inner cylinder and the outer cylinder. In order to support the weight of the inner cylinder 55 and the rings, adjustable rods 69 enter the bottom of the condensing cylinder through packing glands 70. These rods are supported on a yoke 71 which is held in place by weights 72 connected to it over sheave wheels 73. The weights are slightly less than the weight of the cylinder 55 and the rings, etc. carried by it, and resist the longitudinal creep of this cylinder which occurs when metals are heated to high temperatures, and, at the same time, permit longitudinal expansion of the cylinder 55.

Heat is supplied to the inside of cylinder 55 by any suitable means, as, for example, the refractory cylinder 74 containing embedded radiant heat gas burners 75 supplied with a premixed mixture of gas and air through header pipe 76.

With this apparatus the cylinder 55 can be pulled out of the cylinder 62 and the rings can be made in sections for convenience in replacing, in case of damage.

The particular apparatus illustrated has an inner shell 55 of 10 inch outside diameter and is 60 inches long with 24 rings. This type of apparatus is particularly adapted for larger sizes.

With the methods and apparatus described in this application, effective separation of metals by distillation can be accomplished at temperatures not exceeding the temperatures that may be applied to commercially practicable metal parts of the apparatus without impairing their structural strength. For example, tin and lead may be separated by distillation and condensation under vacuum (for instance, at absolute pressures of from .01 to 2. millimeters of pressure) at temperatures sufficiently low to avoid collapsing of the apparatus under the differential pressure to which it is subjected. In such operations ordinary steel tubing, if protected on the sides exposed to oxidation by a non-oxidizing coating, such as chromium plating, may be heated with safety to temperatures of 1800° F. and by the use of alloy steel, such as high chromium-nickel alloys, temperatures as high as 2000° F. may be used. With less vacuums (higher absolute pressures), it will be necessary to use higher temperatures to effect the distillation, thus requiring a metal that will withstand the differential pressures at such higher temperatures.

The outer and inner walls of the apparatus may be of any material which will withstand the differential pressures exerted upon them and be sufficiently impervious to gases at the temperatures and vacuums at which the apparatus is to operate, and which will not be excessively injured by vapors of the metals to be distilled. As previously indicated, nickel-chromium steels may be used for this purpose. The rings and other parts with which the hot molten metal contacts may be made of any material of sufficient strength to stand up under the temperatures used, that will not absorb the metals flowing over it, and that will not give off constituents that will alloy with these metals. Since the condensing surface is at a lower temperature, and lead is relatively inert toward other metals, the condensing surface need not be as fully protected from the molten metal as the distilling surface. In fact, an extra heavy iron pipe is suitable for the inner cylinder 53. The distilling surface, however, should be protected by a suitable refractory material. For instance, the rings 24, 24a, 49, 50, 58, 59, etc. and the tubes 46d, 51, 60, etc. may be made of pressed graphite, or of silicon carbide, or of a dense refractory material, such as fused alundum, or even of metals which are not subject to damage by the molten tin or other metals or metal vapors in contact with it.

Given the partial pressure at different temperatures and in varying molar concentrations of the metal to be evaporated, it is evident that the capacity of the apparatus and the rate of distillation to be obtained may be calculated by correlating the rates of heat input, the temperatures and the degree of vacuum to be used, to the relative temperature and areas between evaporating and condensing surfaces.

The ratio of length to diameter of the cylinders used is a question of maximum heat economy equated to the strength of the materials of construction used.

It is apparent that many variations may be made in the method and apparatus described. For example, the apparatus is not limited in design to the particular forms of rings shown in the figures. For instance, instead of using separate rings as shown, it is possible to use a continuous spiral groove on the inside surface of the outer cylinder with its pitch so regulated as to give the desired time of passage through the apparatus for the completion of distillation.

In any of the embodiments, the condensing cylinder may be highly polished to reduce radiation losses. It may be smooth-walled, as shown in Figure 2, or in cases where a greater condensing area is required, it may be fluted or grooved, as shown in Figure 6. If the length of condensing cylinder is such that drops of condensate falling from it may cause excessive splash when impinging upon the bottom plate, or if for other reasons it is desired to slow up the flow of the condensate, the condensing cylinder may be equipped with spiral grooves or with rings which will trap this condensate and cause it to flow smoothly to the bottom of the cylinder. In cases where it is desired to fractionally separate different metals in the same apparatus, such, for instance, as bismuth from lead, and further on, lead from tin, it is possible, by tapping spiral grooves or rings on the condensing cylinder at different points, to withdraw various fractions of the condensed metals. In that event, it may be desirable to vary the cooling or heating of the various portions of the apparatus so as to favor such fractional separation.

Other means than the barometric tubes, of course, may be provided for removing the residue and the condensate. For example, these may be collected in wells or other receptacles within the vacuum chamber and the molten metal may be pumped out continuously or it may be pumped or otherwise removed periodically. Also, other means may be provided for feeding and regulating the feed of the material to be distilled, for example, a pump or gravity flow with a suitable valve may be used for this purpose.

It is also apparent that the features shown or described in connection with the various modifications may be interchanged or may be used separately or with other combinations. The various pressures, temperatures and other conditions of operation may be varied, depending upon the materials being treated and the particular results desired. In the separation of lead from tin, distilling temperatures of about 1700 to 2000° F. under absolute pressures of about .01 to .15 mm. of mercury have been found suitable. Condensing temperatures of about 1100° to 1300° F. are suitable in the apparatus described. The minimum temperature of the condenser is a temperature just above the melting point of lead, or approximately 650° F., and from the point of view of condensation only this is the optimum temperature. However, with such a low condenser temperature, such high radiation from the evaporating surface may be obtained that the evaporating surface would be cooled below its optimum temperature.

In describing the invention the terms used have been used as terms of description and not as terms of limitation and it is intended that the equivalents of the terms used be included within the scope of the invention. In using the term "in thermal contact" in the claims, it is intended to include substances in contact through materials that readily transmit heat as distinguished from relatively poor conductors of heat, such as air.

No claim is made herein to various specific features such as the barometric feed or the external heating and internal cooling, since these features are covered in copending application Serial No. 284,678, filed July 15, 1939.

We claim:

1. A method of separating metals from a mixture thereof, comprising flowing a relatively thin layer of the mixture in a molten condition, and under less than atmospheric pressure, over a surface in a container heated sufficiently to volatilize at least one of the metals without substantial volatilization of at least another one of the metals, condensing the volatilized metal in said container and separately collecting the condensed vapors and undistilled residue in their liquid form.

2. A method of separating metals from a mixture thereof that is solid at normal room temperature, comprising melting the mixture of metals and flowing a substantially continuous stream of it in a molten condition, and under less than atmospheric pressure, over a surface in a container heated sufficiently to volatilize at least one of the metals without substantial volatilization of at least another one of the metals, condensing the volatilized metal in said container under less than atmospheric pressure, and separately collecting the condensed vapors and undistilled residue.

3. A method of separating metals comprising the steps of introducing a molten mixture of the metals into a chamber maintained under a partial vacuum, flowing said mixture in a relatively thin layer over a heated surface in the chamber to vaporize at least one of said metals, condensing the vapor within said chamber and separately withdrawing the condensed vapors and undistilled metal from the chamber.

4. A method as defined in claim 1, in which tin and lead are separated by heating to about 1700° to 2000° F. under an absolute pressure of about .01 to .15 mm. of mercury.

5. A method as defined in claim 3, in which tin and lead are separated by heating to about 1800° F. at an absolute pressure of about 0.05 mm. and condensing at about 1200° F.

6. A method of separating metals from a mixture thereof, comprising flowing the mixture in a molten condition, and under less than atmospheric pressure, over a surface heated sufficiently to vaporize at least one of said metals without vaporizing at least another of said metals, condensing the vaporized metal under less than atmospheric pressure upon a surface extending along the path of flow of the molten mixture and slightly spaced from the surface of the metal being vaporized, and separately collecting the condensed vapors and undistilled residue.

7. A method of separating metals from mixtures thereof, comprising flowing the mixture in a molten state and under less than atmospheric pressure, over an elongated path in a relatively thin layer, said path being within a container and heated sufficiently to volatilize at least one of the metals without substantial volatilization of at least another of the metals, condensing the volatilized metal on a surface within said container extending along said elongated path, and separately collecting the condensed vapors and undistilled residue.

8. A method of separating substances of different volatility, comprising flowing a molten mixture of the substances continuously over a surface under less than atmospheric pressure, said surface being within a container and heated sufficiently to volatilize at least one of the substances without substantial volatilization of at least another of the substances, condensing the volatilized substances under less than atmospheric pressure and continuously withdrawing the condensed vapors and undistilled residue from the container through barometric columns of the substances being withdrawn.

9. A method as defined in claim 1 in which the metal mixture is heated and condensed in an annular chamber of at least about 10 inches inside diameter, which annular chamber is internally heated and externally cooled.

10. An apparatus for separating molten materials comprising a heated container, an elongated path for the molten materials adjacent the heated surface of said container, a cooled condensing surface within said container spaced from said heated surface and means for applying a partial vacuum to the space in said container between the heated and condensing surfaces, said path being constructed of material substantially inert to molten metals.

11. An apparatus as defined in claim 10, in which the elongated path is made up of a series of grooved plates, each having a discharge opening onto the plate beneath it.

12. An apparatus as defined in claim 10, in which the elongated path is in thermal contact with an inner heated wall and the condensing surface is the outer wall of an annular space having an inside diameter of at least 10 inches.

13. An apparatus for separating molten metals, comprising a casing having a heated surface, an elongated path in said casing of heat conductive material that is in thermal contact with said heated surface and that is substantially inert to and non-absorptive of said molten metals, a condensing surface within said casing and means for applying a vacuum to said casing.

14. An apparatus as defined in claim 13, in which the heat conductive material is of refractory material of the class consisting of graphite, silicon carbide and fused alundum.

15. An apparatus as defined in claim 13, in which the heated surface of the casing is of metal and the heat conductive material is of non-metallic material.

16. An apparatus as defined in claim 13, in which the heated surface of said casing is of a corrosion resistant alloy containing nickel and chromium and the heat conductive material is of pressed graphite.

17. An apparatus as defined in claim 13, in which the heated surface of said casing is of nonferrous nichrome metal containing about 80% nickel and 20% chromium.

18. An apparatus for separating molten materials, comprising a casing having a corrosion resistant surface exposed to heat, a metallic structural material within said casing and in contact with said heated surface, an elongated path of material supported by said structural material, said path being of a material that is substantially inert to and non-absorptive of said molten materials, a condensing surface within said casing, and means for applying a vacuum to said casing.

19. An apparatus as defined in claim 18, in which the corrosion resistant material is a nickel-chromium alloy, the structural material is of cast ferrous metal and the path is of pressed graphite.

20. An apparatus for separating molten materials, comprising a container having a heated surface and a cooled surface, means for applying vacuum to a space in said container between said heated and cooled surfaces, and barometric columns for separately withdrawing condensed vapors and undistilled residue from said space.

21. An apparatus for separating metal-containing materials of different volatility, comprising a container having a heated surface and a cooled surface, means for applying a vacuum to the space within said container between the heated and cooled surfaces, and a path of refractory material supported in said container in thermal contact with said heated surface to provide an evaporating surface for the molten metal-containing materials to be separated.

22. An apparatus as defined in claim 20 in which the container is shaped to provide an internally heated and externally cooled annular space of at least about ten inches inside diameter.

23. An apparatus for separating molten materials, comprising a path of refractory material supported by metal supports in contact with a shell of relatively thin flexible impervious material adapted to be exposed to heat, said shell and supports forming one wall of a container in which said path is contained, a cooled wall of said container spaced from the said path and means for applying a vacuum to the space within the container.

24. An apparatus for separating substances of different volatility, comprising a member providing an elongated path of refractory material, a flexible shell surrounding said member providing a casing therefor, said shell being provided with an expansion joint, means for applying a vacuum to the inner portion of said casing and means for applying heat to an outer portion of said casing.

25. An apparatus for separating molten materials, comprising a member providing an elongated path of refractory material, a flexible shell of material having a coefficient of expansion such that it expands more rapidly than the said member upon being heated, said shell forming a casing surrounding said member and being provided with an expansion joint, means for applying a vacuum to the inner portion of said casing and means for applying heat to an outer surface of said casing.

26. In the subjecting of an apparatus, having an inner member, and a flexible outer member closely surrounding and forming a casing for the same and of different coefficient of expansion than the inner member, to marked temperature changes, the steps comprising applying pressure to the inner surface of the casing, only during the temperature change.

27. In the preparation of a vacuum apparatus having an inner member and a flexible outer shell surrounding and forming a casing for the same and of different coefficient of expansion than the inner member, the steps of applying a pressure to the inner surface of the casing, heating the apparatus to substantially the operating temperature, and then applying vacuum to the inner surface of the casing.

28. In the heating to operating temperature of a vacuum apparatus having an inner member and a flexible outer member closely surrounding and forming a casing for the same, and having a greater coefficient of expansion than the inner member, the step comprising applying pressure to the inner surface of the casing during the heating to approximately the operating temperature.

29. In the cooling from operating temperature of a vacuum apparatus having an inner member and a flexible outer member closely surrounding and forming a casing for the same, and having a greater coefficient of expansion than the inner member, the step comprising applying pressure to the inner surface of the casing during the cooling from substantially the operating temperature.

30. In the subjecting of an apparatus, having an inner member, and a flexible outer member closely surrounding and forming a casing for the same and of different coefficient of expansion than the inner member, to marked temperature changes, the steps comprising applying pressures at least equal to atmospheric pressure to the inner surface of the casing during such temperature changes.

31. In the subjecting of an apparatus, having an inner member, and a flexible outer member closely surrounding and forming a casing for the same and of different coefficient of expansion than the inner member, to marked temperature changes, the steps comprising maintaining pressure within the inner surface of the casing substantially equal to that of the external atmosphere while the apparatus is being heated and applying pressure greater than that of the external atmosphere to the inner surface of the casing while it is being cooled.

32. A method of separating substances of different volatility, comprising flowing a molten mixture of the substances continuously over a surface under less than atmospheric pressure, said surface being within a container and heated sufficiently to volatilize at least one of the substances without substantial volatilization of at least another of the substances, condensing the volatilized substances in said container under less than atmospheric pressure, and withdrawing either or both of the condensed vapors and undistilled residue from the container through barometric columns of the substances being withdrawn.

33. An apparatus for separating molten materials, comprising a container having a heated surface and a cooled surface, means for applying vacuum to a space in said container between said heated and cooled surfaces, and one or more barometric columns for separately withdrawing either or both the condensed vapors and undistilled residue from said space.

34. An apparatus for separating molten materials, including a container having a flexible shell, an elongated evaporating path of non-flexible material in thermal contact with the said shell, a condensing surface within said container spaced from said elongated path, means for applying a vacuum to said shell and surface, means for heating said flexible surface and means for cooling said condensing surface.

35. An apparatus as defined in claim 34 in which the flexible shell is of nickel-chromium alloy and the elongated path is of pressed graphite supported in a structural material of cast ferrous metal.

36. A method as defined in claim 1 in which tin and lead are separated by heating to about 1700° to 2000° F. under an absolute pressure of about .01 to .15 mm. of mercury and in which the lead is condensed under the same pressure at about 1100° to 1300° F.

WILLIAM H. OSBORN.
SIDNEY B. TUWINER.